Figure 1:
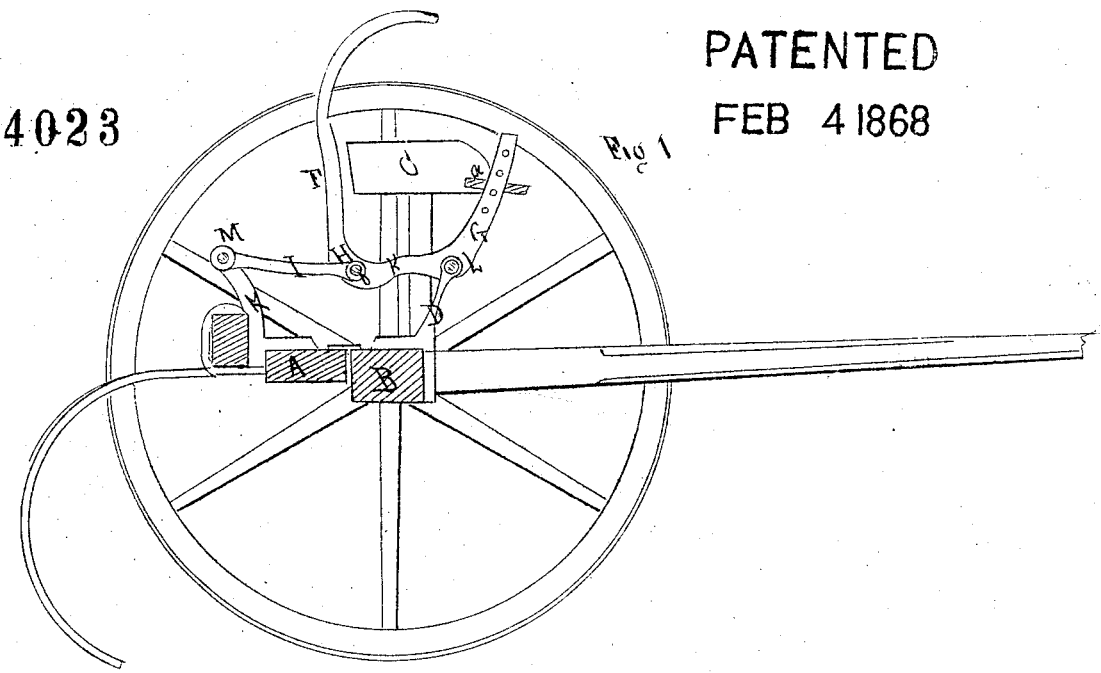

John R. Whittemore's Imp'd Rake
Chicopee Falls, Mass.

74023

PATENTED
FEB 4 1868

Inventor
John R Whittemore
by his atty
Gardiner & Hyde

Witnesses
Louis C. Rodier

United States Patent Office.

JOHN R. WHITTEMORE, OF CHICOPEE FALLS, MASSACHUSETTS.

Letters Patent No. 74,023, dated February 4, 1868.

IMPROVEMENT IN HORSE-RAKES.

The Schedule referred to in these Letters Patent and making part of the same.

TO ALL WHOM IT MAY CONCERN:

Be it known that I, JOHN R. WHITTEMORE, of Chicopee Falls, Hampden county, Commonwealth of Massachusetts, have invented a new and useful Improved Horse-Rake; and I do hereby declare that the following is a full and exact description thereof, reference being had to the accompanying drawings, and to the letters of reference marked thereon. In the drawings—

Figure 1 is a side view of my invention, and

Figure 2:
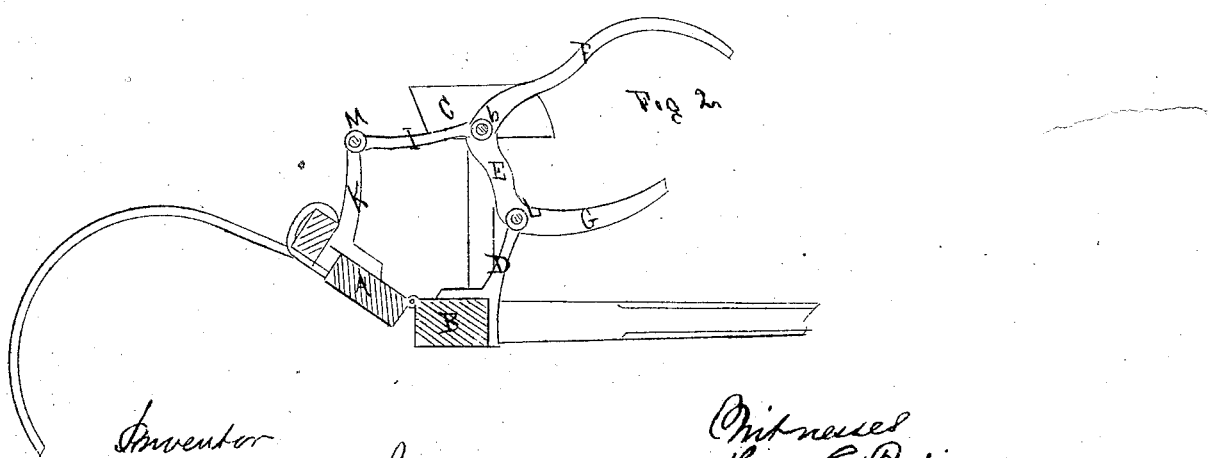

Figure 2 a similar view, with a different position of parts.

This invention consists of a hay-rake constructed so as to be easily and perfectly operated by the driver.

In construction, I attach the bar A, into which are set the teeth, directly to the axle B, upon which is erected the driver's seat C. Upon the right side of this seat is the device for lifting the teeth of the rake in order to allow the stuff gathered to be left on the ground. This device is formed as follows:

Upon the axle B, by the side of the seat, is placed a fulcrum, D, upon which works a double lever, E, having two arms, F and G; the one, G, being in front, and having a foot-board, a, which is adjustable to the proper height to suit the operator's convenience, and the lever-arm F being behind, and formed right-angled, having its upper end bent over, and shaped for a handle for the operator's hand. At the angle of this lever, at H, is hinged a link, I, by means of a pin, b. The other end of this link is hinged to an arm, K, attached to the bar A, and extending back and up sufficiently far to cause the teeth of the rake to be lifted the proper height, when operated by the lever E.

When the teeth of the rake are down, as shown in fig. 1, they are somewhat locked by the position of the link I, which falls at its front end, far enough to bring the pin b nearly in a line with the hinges L (where the lever E is hinged upon the fulcrum D) and M, (where the link I is attached to the end of the arm K.) This forms a dead-point, so that the slightest pressure backwards upon the lever-arm G would keep the teeth firmly down. The link I is prevented from falling down too far, by means of a stop or the construction of the joint at M.

The advantages of this arrangement consist in the ease by which a man driving the rake can operate the same, the simplicity and fewness of the parts used, and the perfectness of its operation.

Now, having described my invention, what I claim as new, and desire to secure by Letters Patent, is—

The device for operating the teeth of the rake, consisting of the double-armed lever E, fulcrumed at L, and connected to the arm K by means of the link I, hinged at its elbow at H, the parts being arranged substantially as herein shown, and for the purposes set forth.

JOHN R. WHITTEMORE.

Witnesses:
   EDWARD C. HYDE,
   J. K. WILSON.